US008589459B1

(12) United States Patent
Ganesan

(10) Patent No.: US 8,589,459 B1
(45) Date of Patent: Nov. 19, 2013

(54) PRIVACY AND SECURITY ENHANCED INTERNET GEOLOCATION

(71) Applicant: Ravi Ganesan, West Palm Beach, FL (US)

(72) Inventor: Ravi Ganesan, West Palm Beach, FL (US)

(*) Notice: Subject to any disclaimer, the term of this patent is extended or adjusted under 35 U.S.C. 154(b) by 0 days.

(21) Appl. No.: 13/669,123

(22) Filed: Nov. 5, 2012

Related U.S. Application Data

(63) Continuation of application No. 12/938,245, filed on Nov. 2, 2010, now Pat. No. 8,341,236.

(60) Provisional application No. 61/257,190, filed on Nov. 2, 2009.

(51) Int. Cl.
*G06F 15/16* (2006.01)

(52) U.S. Cl.
USPC ........... 708/208; 709/224; 717/127; 717/128; 717/135

(58) Field of Classification Search
USPC .......................................... 709/208; 455/466
See application file for complete search history.

(56) References Cited

U.S. PATENT DOCUMENTS

| | | | |
|---|---|---|---|
| 5,874,918 A | 2/1999 | Czarnecki et al. | |
| 5,930,474 A * | 7/1999 | Dunworth et al. | 709/217 |
| 6,151,631 A * | 11/2000 | Ansell et al. | 709/229 |
| 6,249,252 B1 * | 6/2001 | Dupray | 342/450 |
| 6,684,250 B2 * | 1/2004 | Anderson et al. | 709/225 |
| 6,947,978 B2 | 9/2005 | Huffman et al. | |
| 7,100,204 B1 | 8/2006 | Myllymaki et al. | |
| 7,194,354 B1 | 3/2007 | Oran et al. | |
| 2005/0071417 A1 | 3/2005 | Taylor et al. | |
| 2007/0167171 A1 | 7/2007 | Bishop | |
| 2010/0153540 A1 * | 6/2010 | Li et al. | 709/224 |

OTHER PUBLICATIONS

Geolocation Software (http://en.wikipedia.org/wiki/Geolocation_software).
Quova "How we do it" (http://www.quova.com/what/how-we-do-it/).
IP2Location (http://www.ip2location.com).
An Investigation of Geographic Mapping Techniques for Internet Hosts (Venkata N. Padmanabhan and Lakshminarayanan Subramanian).
Constraint-based geolocation of Internet hosts (B. Gueye, A. Ziviani, M. Crovella and S. Fdida).
Towards IP Geolocation Using Delay and Topology Measurements (Ethan Katz-Bassett et al).

* cited by examiner

*Primary Examiner* — Tauqir Hussain

(57) ABSTRACT

The present invention provides a security and privacy enhanced method for geolocation. The system works by creating a space called the N–4Tk space on top of the Internet by locating N geographically dispersed servers in the Internet and computing as the coordinate for any computing device on the Internet, its distance to the N servers. The distance is computed as the 4Tk distance which is the time taken by a message of size k to travel between two points at a particular time of day. The system can also be used iteratively where each iteration uses a different set of Slaves in order to close in on the user with finer granularity. Interesting benefits of the system include the difficulty for an attacker to misrepresent the location, and also while the system can hone in on a locale for the user it does not violate the user's privacy.

20 Claims, 1 Drawing Sheet

The components for the preferred embodiment

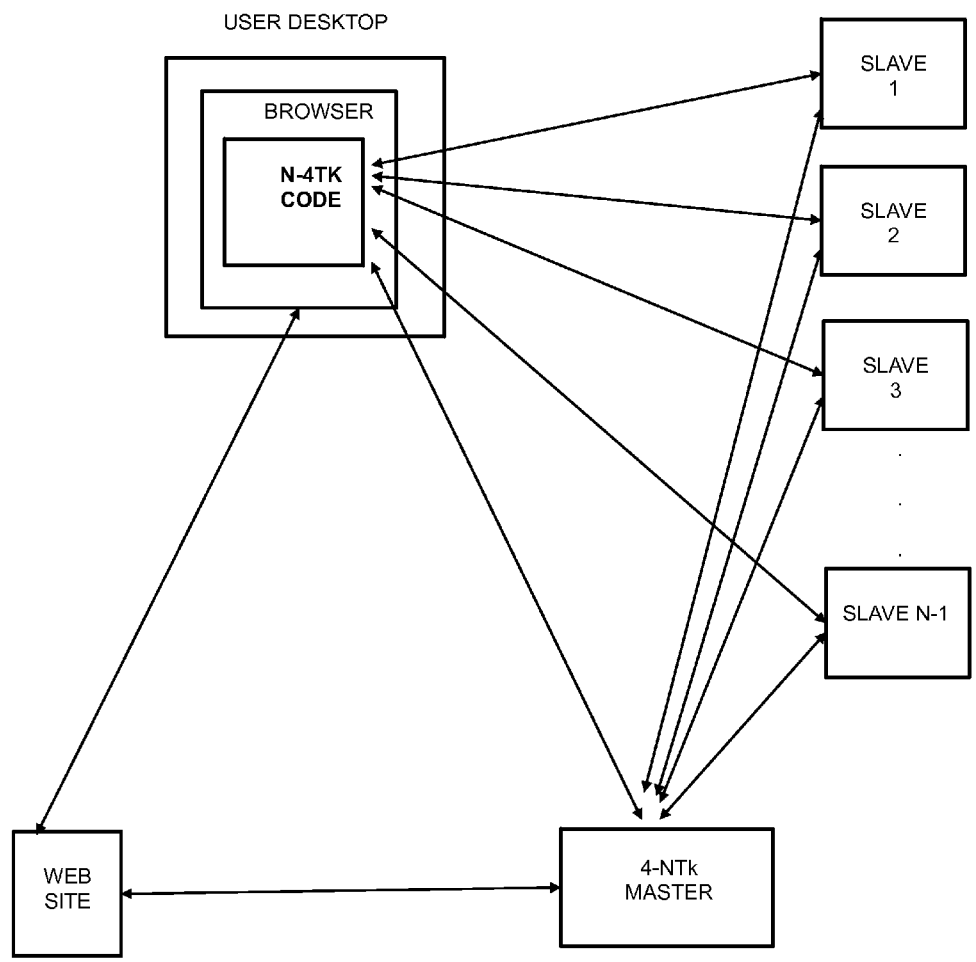
The components for the preferred embodiment

PRIVACY AND SECURITY ENHANCED INTERNET GEOLOCATION

RELATED APPLICATIONS

This application is a continuation of application Ser. No. 12/938,245 which has received a notice of allowance and which claims priority based on Provisional U.S. Application Ser. No. 61/257,190, filed Nov. 2, 2009, and entitled "Project Hawk", the contents of which are incorporated herein in their entirety by reference.

TECHNICAL FIELD

This invention relates to security and privacy. Specifically it relates to the determination of the physical location of Internet users in a way that enhances security and privacy.

BACKGROUND OF THE INVENTION

Companies running web sites often have good reason to try and ascertain the physical location (or geolocation) of the user accessing their sites. Such geolocation information is useful for purposes such as marketing (e.g. to better target offers or advertisements) as well as fraud detection (e.g. if a user who normally checks their bank account from Wichita, Kans. is found to be logging in from East Europe, it might be reason enough for the bank to track the user's activities on the web site carefully).

When a user accesses a web site the only piece of information the web site knows is the user's origin IP address. To get from an IP address to a physical address requires the use of a technology known as IP geolocation. Ranges of IP addresses are assigned to Internet Service Providers who then make them available to end customers in different locales. For instance, the range 149.141.x.x might currently be in use by a particular ISP who is using that range in Alexandria, Va. IP geolocation technology essentially provides a reverse lookup on a database of a physical location given an IP address. The database is maintained by determining which ranges are in use in which locales and then updating the database as changes occur. IP geolocation has two significant shortcomings. First, the database underlying the reverse look-up is largely static and has to be manually updated which can result in errors. Perhaps more critical is the second shortcoming in that IP geolocation identifies a user very precisely and ties them to a particular PC. For most uses of IP geolocation it is usually sufficient for a web site to know that the user is currently located, for example, in Alexandria, Va. Knowing that they are precisely at IP address 141.149.1.1, and storing that information, is a needless violation of the user's privacy and in general storing personally identifiable data, especially when not required, is a needless increase in costs and potential liability to the web site.

An alternate method already prevalent in smartphones, and some computers, is to have a program on the phone to report the GPS coordinates of the user. Such GPS systems also provide more precise location data than is needed in most cases, and moreover cannot necessarily be used for fraud detection. This is because the GPS coordinates are self-reported by the software on the smartphone and consequently can fairly easily be thwarted by an attacker.

The innovation described herein provides a new method of IP geolocation that is both more secure (more difficult for an attacker to mislead) and provides more privacy to the user.

OBJECTIVES OF THE INVENTION

This invention has the following objectives:

Develop a new method of Internet geolocation that enhances security by making it harder for an attacker to misrepresent their location.

Develop a new method of Internet geolocation that enhances user privacy by allowing their general location to be determined without pinpointing their specific location or tying them to a particular PC.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

Our first innovation is to define a new N dimensional space called the N–4Tk space. This N-coordinate space is created by placing N servers at geographically dispersed locations across the Internet, and the coordinates for any given location on the Internet is a measure of the time it takes for data to travel between the location and the N servers. This is very roughly analogous to how the strength of a signal from a cell phone to multiple cell towers allows triangulation to locate the actual cell phone. However, that analogy does not quite work on the Internet as the time it takes for data to travel between any two points on the Internet depends on a variety of factors beyond physical distance, such as bandwidth, the time of day, what else a user might be downloading on their PC at that time, etc.

Our second innovation is to define a measure called 4Tk which is defined as the "Time Taken to Travel at that particular Time for a message of size k". By tying the time to travel to a specific time of day this measure adjusts for fluctuations in bandwidth depending on the time of day. By ensuring that the measurement is made for a message with a well-chosen size k, fluctuations due to the size of the message are accounted for.

Our third innovation is to designate one of the N servers as the Master, the rest as Slaves, and to calculate the 4Tk metric from an end user computer to the N servers, and to then aggregate all the 4Tk measurements at the Master in order to calculate the location of the user computer in the N–4Tk space.

Our fourth innovation is to measure the 4Tk distance from each Slave to the Master when the message travels through the user's computers.

Our fifth innovation is to compare the given 4Tk metric for a given user at a particular time with the historical data for that user to compute a risk score.

Our sixth innovation is to do a differential analysis on the 4Tk measurements to adjust for delays observed by all the servers, which could be caused by delays in the user's local PC or network (for e.g. if they are in parallel watching a streaming movie).

Our seventh innovation is to capture these measurements unobtrusively as the user types in data they would have anyway typed in such as a UserID or a CAPTCHA.

Our eighth innovation is to search the time between keystrokes for unusual patterns that could be indicative of proxy access at the user computer from a remote site.

Our ninth innovation is to iteratively "close-in" on the user by varying the particular servers used for the coordinate calculation. For instance, the first iteration might quickly determine that the user is in the United States, the second the particular metro area, the third the locale within the metro and so on.

Our tenth innovation is to allow the servers to periodically exchanges messages amongst each other in order to calculate measures that can be used to further refine the 4-NTk measurements for a given user.

Our eleventh innovation is to use a large number of 4Tk measurements across a large number of users to compute a real time effective bandwidth map of the Internet to be used for purposes such as intelligent placement of caches or routing.

BRIEF DESCRIPTION OF DRAWINGS

FIG. 1 describes the main components of the system.

PREFERRED EMBODIMENT(S) OF THE INVENTION

Our preferred embodiment consists of the following components as shown in FIG. 1:

The web site which is using the N-4Tk system which serves up the page containing the N-4Tk code to the user's browser.

The user's PC that is being geolocated and on which the N-4Tk client code runs.

The Master server which will compute the geolocation and report back to the web server.

The N-1 geographically distributed Slaves in the system.

The process is initiated by the user browsing to a page at a web site that contains the N-4Tk client code. This client code will typically be embedded behind the scenes of a page into which the user types in a UserID, or perhaps a CAPTCHA. Several variations are possible here, but the general idea is to invoke the N-4TK code at some point where the user is typing in characters. For simplicity of exposition we will assume here that the user is typing in their UserID.

As the user types in each character in the UserID, the character is padded with k-1 characters (say 0s) and sent to the web site, the Master, and the Slaves (the addresses of which are available to the client code). Subsequent characters are sent after receipt of an acknowledgement from the Master. Each character is time stamped at the last possible instant before being sent, and again time stamped at the first possible instant after being received. The difference between the two time stamps is a measure of the time taken for the message to travel from the user to the particular server (either Master or Slave). Each Slave forwards the message (with the time stamps) to the Master. The client sends a special "End of Transaction" character to indicate that the user has finished typing in the UserID.

The Master having received all the messages from the Slaves, as well as the messages sent to it directly, now has all the data needed to compute the N-4TK location of the User. If the Master has not encountered this UserID (from this Web Site) before it, it records it, else, it might look up the historical record of N-4Tk locations for this user. It then returns its estimate of the locale of the user to the web site, or a risk score indicating the variance from the previously measured locale.

To account for processing delays on the User's PC or local network, which would uniformly delay all the messages, the Master can be set up to take note of unusual delays effecting messages to all the servers and adjust the metric accordingly. The Master can also examine the delays between keystrokes to look for unusual patterns.

In all these calculations the Master computes the mean and standard deviation of the message time to each server for all the characters in the UserID. For instance, for a 15 character UserID, the Master in effect has a sample size of 15 measurements to each server. This allows it to get a better estimate than were it doing a single measurement.

An alternate metric that can be calculated is for the client code to request a message of size k from each Slave and then forward it to the Master. This measures the N-4Tk distance from each Slave to the Master via the User.

The Master can additionally require the Slaves to periodically directly send it messages so that it can compute a 4Tk direct distance from itself to the Slaves, and use that information to refine the metrics calculated above.

The accuracy of all of the above metrics improve as the number of Slaves increases, however, this brings additional costs and latency. One approach is to iteratively "close in" on the user by using a different set of Slaves in each iteration. For instance the system could first hone in on the country of origin, next the major metro area and then close in on the specific locale.

Finally, such a system that is making calculations for a large number of users (perhaps for multiple web sites) is in effect calculating a 'time of day' sensitive bandwidth map of the Internet as a side effect. This information can be used for intelligent placement of caches or routing of traffic.

What is claimed is:

1. A method of determining a geographical location of a user network device communicating with a network site on a network having a master server and multiple slave servers, including a first slave server and a second slave server, the method comprising:

receiving, at the master server via the network, (i) messages sent from the user network device, each message including a user input character padded with k-1 characters, where k equals a predefined message size, and (ii) a time stamp associated with each message and corresponding to the time that message was sent by the user network device to the master server;

stamping, at the master server, each of the received messages with a time stamp corresponding to the time of receipt of that message at the master server;

receiving, at the master server from the first slave server via the network, (i) the same messages, (ii) a time stamp associated with each message and corresponding to the time that message was sent by the user network device to the first slave server, and (iii) a time stamp corresponding to the time of receipt of that message at the first slave server;

receiving, at the master server from the second slave server via the network, (i) the same messages, (ii) a time stamp associated with each message and corresponding to the time that message was sent by the user network device to the second slave server, and (iii) a time stamp corresponding to the time of receipt of that message at the second slave server;

computing, at the master server based on the time stamps, the time taken to communicate the messages (i) from the user network device to the master server, (ii) from the user network device to the first slave server, and (iii) from the user network device to the second slave server; and determining, at the master server, a geographic location of the user network device as a function of the computed times.

2. The method according to claim 1, further comprising:
transmitting, from the master server to the network site, the determined geographic location of the user network device.

3. The method according to claim 1, wherein:
the geographic location of the user network device is also determined as a function of the particular time of day at which each of the messages is sent by the user network device;
the computed time taken to communicate messages (i) from the user network device to the master server is an average of the time taken to communicate each of the messages to the master server, (ii) from the user network device to the first slave server is an average of the time taken to communicate each of the messages to the first slave server, and (iii) from the user network device to the second slave server is an average of the time taken to communicate each of the messages to the second slave server; and
each user input character is a character of either a UserID or a CAPTCHA.

4. The method according to claim 1, further comprising:
determining, at the master server, a risk score based on previously determined geographic locations of the user network device or of the user.

5. The method according to claim 4, wherein:
the risk score is determined based on previously determined geographic locations associated with the particular time of day at which the messages are sent by the user network device.

6. The method according to claim 1, further comprising:
determining, at the master server, that abnormal delays in communications exist between the user network device and substantially all the servers; and
adjusting the determined geographic location based on the determined delays.

7. The method according to claim 1, further comprising:
detecting time between user keystrokes to input the characters; and
determining whether or not the detected time corresponds to an anomalous pattern.

8. The method according to claim 1, wherein the messages are first messages and the multiple slave servers also include a third slave server and a fourth slave server, the method further comprising:
receiving, at the master server via the network, (i) second messages sent from the user network device, each second message including a user input character padded with k−1 characters, and (ii) a time stamp associated with each second message and corresponding to the time that message was sent by the user network device to the master server;
stamping, at the master server, each of the received second messages with a time stamp corresponding to the time of receipt of that message at the master server;
receiving, at the master server from the third slave server via the network, (i) the same second messages, (ii) a time stamp associated with each second message and corresponding to the time that message was sent by the user network device to the third slave server, and (iii) a time stamp corresponding to the time of receipt of that message at the third slave server;
receiving, at the master server from the fourth slave server via the network, (i) the same second messages, (ii) a time stamp associated with each second message and corresponding to the time that message was sent by the user network device to the fourth slave server, and (iii) a time stamp corresponding to the time of receipt of that message at the fourth slave server;
computing, at the master server based on the time stamps associated with the second messages, the time taken to communicate the second messages (i) from the user network device to the master server, (ii) from the user network device to the third slave server, and (iv) from the user network device to the fourth slave server; and
determining, at the master server, a more accurate geographic location of the user network device as a function of the computed times taken to communicate the second messages.

9. A method of determining a geographical location of a user network device communicating with a network site on a network having a master server and multiple slave servers, including a first slave server and a second slave server, the method comprising:
receiving, at the master server via the network, (i) messages sent from first slave server via the user network device, each message including k characters, where k equals a predefined message size, (ii) a time stamp associated with each message and corresponding to the time that message was sent by the first slave server to the master server, and (iii) a time stamp corresponding to the time of receipt of that message at the user network device;
receiving, at the master server via the network, (i) the same messages sent from second slave server via the user network device, (ii) a time stamp associated with each message and corresponding to the time that message was sent by the second slave server to the master server, and (iii) a time stamp corresponding to the time of receipt of that message at the user network device;
stamping, at the master server, each of the received messages with a time stamp corresponding to the time of receipt of that message at the master server;
computing, at the master server based on the time stamps, the time taken to communicate the messages (i) from the first slave server to the user network device, (ii) from the first slave server to the master server, (iii) from the second slave server to the user network device, and (iii) from the second slave server to the master server; and
determining, at the master server, a geographic location of the user network device as a function of the computed times.

10. The method according to claim 9, further comprising:
transmitting, from the master server to the network site, the determined geographic location of the user network device;
wherein the messages sent from the first and the second slave servers are encrypted messages, and the time stamps corresponding to the times those messages were sent by the first and the second slave servers to the master server, are encrypted time stamps.

11. The method according to claim 9, wherein:
the geographic location of the user network device is also determined as a function of the particular time of day at which each of the messages is sent by the first and the second slave servers; and the computed time taken to communicate messages (i) from the first slave server is an average of the time taken to communicate each of the messages from the first slave server to the user network device and to the master server, and (ii) from the second slave server is an average of the time taken to communicate each of the messages from the second slave server to the user network device and to the master server.

12. The method according to claim 9, further comprising: determining, at the master server, a risk score based on previously determined geographic locations of the user network device or of the user.

13. The method according to claim 12, wherein: the risk score is determined based on previously determined geographic locations associated with the particular time of day at which the messages are sent by the first and the second slave servers.

14. The method according to claim 9, further comprising: determining, at the master server, that abnormal delays in communications exist between the user network device and substantially all the servers; and adjusting the determined geographic location based on the determined delays.

15. The method according to claim 9, wherein the messages are first messages and the multiple slave servers also include a third slave server and a fourth slave server, the method further comprising:
receiving, at the master server via the network, (i) second messages sent from third slave server via the user network device, each second message including k characters, (ii) a time stamp associated with each second message and corresponding to the time that message was sent by the third slave server to the master server, and (iii) a time stamp corresponding to the time of receipt of that message at the user network device;
receiving, at the master server via the network, (i) second messages sent from fourth slave server via the user network device, each second message including k characters, (ii) a time stamp associated with each second message and corresponding to the time that message was sent by the fourth slave server to the master server, and (iii) a time stamp corresponding to the time of receipt of that message at the user network device;
stamping, at the master server, each of the received second messages with a time stamp corresponding to the time of receipt of that message at the master server;
computing, at the master server based on the time stamps, the time taken to communicate the second messages (i) from the third slave server to the user network device, (ii) from the third slave server to the master server, (iii) from the fourth slave server to the user network device, and (iv) from the fourth slave server to the master server; and
determining, at the master server, a geographic location of the user network device as a function of the computed times taken to communicate the second messages.

16. A server for determining a geographical location of a user network device communicating with a network site on a network having multiple other servers, including a first server and a second server, the server comprising:
a port operable to receive, via the network, (A) messages sent from the user network device, each message including a user input character padded with k−1 characters, where k equals a predefined message size, and a time stamp associated with each message and corresponding to the time that message was sent by the user network device to the master server, (B) the same messages sent from the first slave server, a time stamp associated with each message and corresponding to the time that message was sent by the user network device to the first slave server, and a time stamp corresponding to the time of receipt of that message at the first slave server, and (C) the same messages from the second slave server, a time stamp associated with each message and corresponding to the time that message was sent by the user network device to the second slave server, and a time stamp corresponding to the time of receipt of that message at the second slave server; and
a processor, including memory with executable logic, operable to (A) stamp each of the received messages with a time stamp corresponding to the time of receipt of that message, (B) compute, based on the time stamps, the time taken to communicate the messages (i) from the user network device to the master server, (ii) from the user network device to the first slave server, and (iii) from the user network device to the second slave server, and (C) determine a geographic location of the user network device as a function of the computed times.

17. The server according to claim 16, wherein: the processor is further operable to direct transmission of the determined geographic location of the user network device to the network site.

18. The server according to claim 16, wherein each user input character is a character of either a UserID or a CAPTCHA, and the processor is further operable to:
determine the geographic location of the user network device also as a function of the particular time of day at which each of the messages is sent by the user network device; and
compute the time taken to communicate messages (i) from the user network device to the master server by averaging the time taken to communicate each of the messages to the master server, (ii) from the user network device to the first slave server by averaging the time taken to communicate each of the messages to the first slave server, and (iii) from the user network device to the second slave server by averaging the time taken to communicate each of the messages to the second slave server.

19. The server according to claim 16, the processor is further operable to:
determine a risk score based on previously determined geographic locations of the user network device or of the user associated with the particular time of day at which the messages are sent by the user network device;
determine that abnormal delays in communications exist between the user network device and substantially all the servers; and
adjust the determined geographic location based on the determined delays.

20. The server according to claim 16, wherein the messages are first messages and the multiple other servers also include a third slave server and a fourth slave server, wherein:
the port is further operable to receive, via the network, (A) second messages sent from the user network device, each second message including a user input character padded with k−1 characters, and a time stamp associated with each second message and corresponding to the time that message was sent by the user network device to the master server, (B) the same second messages from the third other server, a time stamp associated with each second message and corresponding to the time that message was sent by the user network device to the third other server, and a time stamp corresponding to the time of receipt of that message at the third other server, and (C) the same second messages from the fourth other server, a time stamp associated with each second message and corresponding to the time that message was sent by the user network device to the fourth other server, and (iii) a time stamp corresponding to the time of receipt of that message at the fourth other server the processor is further operable to (A) stamp each of the received second messages with a time stamp corresponding to the time of receipt of that message, (B) compute, based on the time stamps, the time taken to communicate the second messages (i) from the third other server to the user network device, (ii) from the third other server to the server, (iii) from the fourth other server to the user network device, and (iv) from the fourth other server to the server, and (C) determine a more accurate geographic location of the user network device as a function of the computed times taken to communicate the second messages.

\* \* \* \* \*